(12) United States Patent
Garcia et al.

(10) Patent No.: US 8,871,394 B1
(45) Date of Patent: Oct. 28, 2014

(54) METAL-AIR BATTERY WITH REDUCED GAS DIFFUSION LAYER

(71) Applicant: Zinc Air Fuel Cells, Inc., Columbia Falls, MT (US)

(72) Inventors: William A. Garcia, Columbia Falls, MT (US); Howard F. Wilkins, Kalispell, MT (US)

(73) Assignee: ZAF Energy Systems, Incorporated, Columbia Falls, MT (US)

(*) Notice: Subject to any disclaimer, the term of this patent is extended or adjusted under 35 U.S.C. 154(b) by 0 days.

(21) Appl. No.: 14/200,464

(22) Filed: Mar. 7, 2014

(51) Int. Cl.
H01M 12/06 (2006.01)

(52) U.S. Cl.
USPC .......................................... 429/405; 429/403

(58) Field of Classification Search
None
See application file for complete search history.

(56) References Cited

U.S. PATENT DOCUMENTS

| | | | |
|---|---|---|---|
| 3,368,924 A * | 2/1968 | Benderly et al. | 429/118 |
| 3,539,396 A * | 11/1970 | Wagner | 429/406 |
| 3,751,300 A * | 8/1973 | Yamamoto et al. | 156/327 |
| 6,268,084 B1 * | 7/2001 | Hayashida et al. | 429/218.2 |
| 2004/0126636 A1 * | 7/2004 | Horiuchi et al. | 429/30 |
| 2009/0117435 A1 * | 5/2009 | Du et al. | 429/31 |

FOREIGN PATENT DOCUMENTS

| JP | 0822828 A | | 1/1996 |
|---|---|---|---|
| JP | 10162855 A | * | 6/1998 |

OTHER PUBLICATIONS

Gen Inoue, Yosuke Matsukuma, Masaki Minemoto, Abstract of "Evaluation of the Thickness of Membrane and Gas Diffusion Layer With Simplified Two-Dimensional Reaction and Flow Analysis of Polymer Electrolyte Fuel Cell," (Full article information: Journal of Power Sources, vol. 154, Issue 1, Mar. 9, 2006, pp. 8-17), Abstract obtained from http://www.sciencedirect.com/science/arlicle/pii/S0378775305006166, Apr. 25, 2013, p. 1 of 1.

* cited by examiner

Primary Examiner — Patrick Ryan
Assistant Examiner — Haixia Zhang
(74) Attorney, Agent, or Firm — Brooks Kushman P.C.

(57) ABSTRACT

A metal-air battery according to the present disclosure includes an electrode assembly with a first electrode layer having a length and being folded lengthwise, and a gas diffusion layer having a length that is approximately half the length of the first electrode layer. Furthermore, the gas diffusion layer is positioned proximate the first electrode layer or between first and second portions of the first electrode layer.

20 Claims, 3 Drawing Sheets

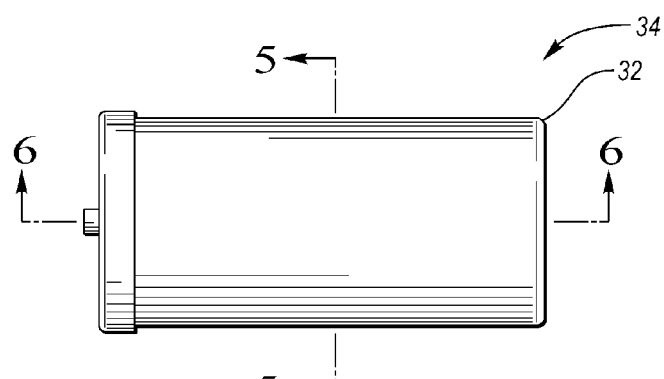
FIG. 4
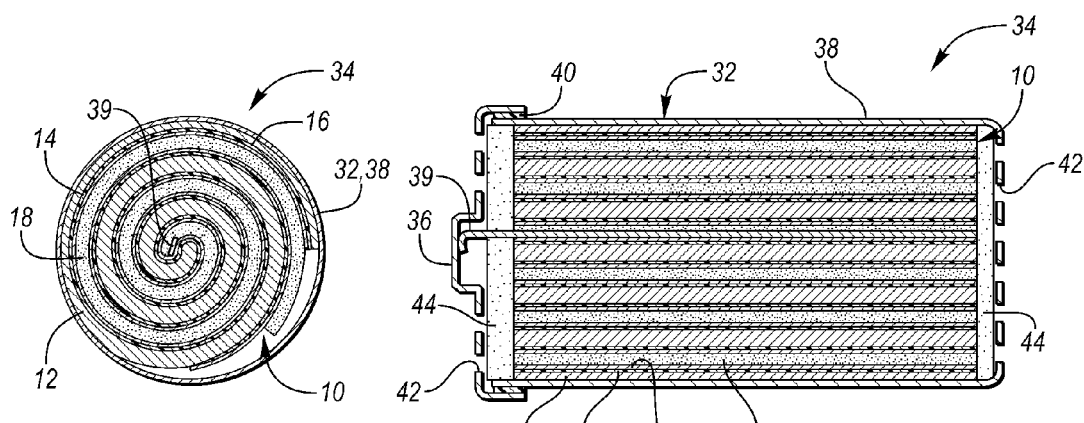
FIG. 5
FIG. 6

METAL-AIR BATTERY WITH REDUCED GAS DIFFUSION LAYER

TECHNICAL FIELD

This disclosure relates to metal-air batteries and electrode assemblies therein.

BACKGROUND

Metal-air batteries are electro-chemical reactors that produce electric current by oxidizing metal with oxygen. These reactors can have high energy densities and be relatively inexpensive to produce. Metal-air batteries may be used to power various items such as hearing aids, cameras and electric vehicles.

A metal-air battery may include a mass of metal that forms a porous anode that is saturated with an electrolyte. During discharge, oxygen reacts at a cathode to form hydroxyl ions that migrate into the metal/electrolyte paste to form a metal hydroxide, releasing electrons to travel to the cathode. The metal hydroxide decays into metal oxide and the resulting water returns to the electrolyte. The water and hydroxyls from the anode are recycled at the cathode, so the water is not consumed. The reverse process can also occur. During charge, electrons react with the metal oxide and water to reform the metal, releasing hydroxyl ions that migrate to the cathode. The hydroxyl ions are then oxidized to oxygen gas and water.

SUMMARY

A metal-air battery according to the present disclosure includes an electrode assembly with a first electrode layer having a length and being folded lengthwise, and a gas diffusion layer having a length that is approximately half the length of the first electrode layer. Furthermore, the gas diffusion layer is positioned proximate the first electrode layer or between first and second portions of the first electrode layer.

A metal-air battery according to an aspect of the present disclosure includes an electrode assembly including an air electrode layer having a length and being folded lengthwise, a negative electrode layer positioned between first and second portions of the folded air electrode layer, and a gas diffusion layer having a length that is approximately half the length of the air electrode layer. Furthermore, the gas diffusion is positioned proximate the first electrode layer.

A metal-air battery according to another aspect of the present disclosure includes an electrode assembly including a negative electrode layer having a length, an air electrode layer having a length that is approximately the same as the length of the negative electrode layer, and a gas diffusion layer having a length that is approximately half the length of the negative electrode layer. The negative electrode layer and the air electrode layer are folded lengthwise over the gas diffusion layer such that the gas diffusion layer is positioned between two portions of each of the negative electrode layer and the air electrode layer.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 4 is a side view of a metal-air battery according to the present disclosure;

FIG. 5 is a cross-sectional view taken along line 5-5 of FIG. 4 and showing the electrode assembly of FIG. 1 in a spiral wound condition, wherein the direction of view is the same as in FIG. 1;

FIG. 6 is a cross-sectional view of the metal-air battery of FIG. 4, taken along line 6-6;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A metal-air battery may include an electrode assembly having a gas diffusion layer that facilitates gas contact with a cathode. Such a gas diffusion layer may occupy a significant volume of the battery, thereby affecting the overall size of the battery. Electrode assemblies disclosed below include reduced size gas diffusion layers that may allow reduction in battery size, while still enabling significant energy storage capacity.

Figure 1:
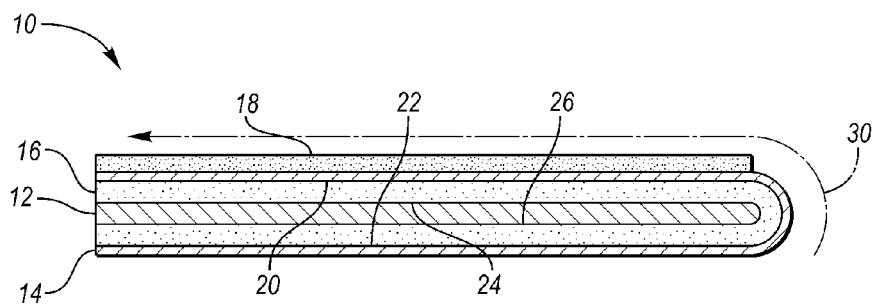
FIG. 1 is a schematic side view of an electrode assembly, according to the present disclosure, including an air electrode layer and a separator layer folded over a negative electrode layer, and further including a gas diffusion layer positioned adjacent a portion of the air electrode layer

FIG. 1 shows a first embodiment 10 of an electrode assembly according to the present disclosure that may be used with a metal-air battery. The electrode assembly 10 includes a negative electrode layer 12 (e.g., an anode layer), an air electrode layer 14 (e.g., a positive air electrode layer or an air cathode layer), a separator layer 16 positioned between the negative electrode layer 12 and the air electrode layer 14, and a gas diffusion layer 18 positioned proximate a portion of the air electrode layer 14.

In the embodiment shown in FIG. 1, the air electrode layer 14 and separator layer 16 each have approximately the same length, and those layers 14 and 16 are folded over the negative electrode layer 12 lengthwise such that the negative electrode layer 12 is disposed between two portions 20 and 22 of the air electrode layer 14, and two portions 24 and 26 of the separator layer 16. Furthermore, the gas diffusion layer 18 is disposed on the air electrode layer 14 adjacent the first portion 20, such that the gas diffusion layer 18 is in contact with the air electrode layer 14. In another embodiment, one or more additional layers, such as one or more hydrophobic layers, may be positioned between the gas diffusion layer 18 and the air electrode layer 14.

With the above configuration, the negative electrode layer 12 and the gas diffusion layer 18 may each have a length that is about half the length of one or both of the air electrode layer 14 and the separator layer 16. For example, the length of each of the negative electrode layer 12 and the gas diffusion layer 18 may be 40% to 60% of the length of the air electrode layer 14 and/or the separator layer 16. As another example, the length of each of the negative electrode layer 12 and the gas diffusion layer 18 may be 45% to 55% of the length of the air electrode layer 14 and/or the separator layer 16. As a result, the overall size of the electrode assembly 10 may be significantly reduced compared to prior electrode assemblies.

The negative electrode layer 12 of the electrode assembly 10 may be made of any suitable material, such as an active material disposed on a suitable substrate. For example, zinc and/or zinc oxide powders or granules with or without metal powder additives, such as bismuth, indium, and/or aluminum oxide, may be mixed into a slurry with the use of polymer binding materials, such as polyvinyl chloride (PVC), polytetrafluoroethylene (PTFE) or polyvinylideneflouride (PVDF), and a solvent, such as water or organic solvent, then that material may be adhered to a conductive foil substrate or a porous conductive foam or an expanded metal mesh through the adhesive qualities of the binder. As another example, the metal powder or oxides of the active material may include aluminum, lithium, magnesium or other electrochemically active metals. Furthermore, the negative electrode layer 12 may include active material disposed on a single-side of a foil substrate, or on both sides of a foil substrate (i.e., a double-sided negative electrode layer), such as in the illustrated embodiment.

Likewise, the air electrode layer 14 may be made of any suitable material. For example, the air electrode layer 14 may include a catalyst, such as a spinel, a perovskite, a platinum group metal, manganese dioxide, silver oxide etc., mixed into a slurry with the use of polymer binding materials, such as polyvinyl chloride (PVC), polytetrafluoroethylene (PTFE) or polyvinylideneflouride (PVDF), and adhered to a conductive substrate, such as nickel foam, expanded metal or carbon felt, through the adhesive qualities of the binder.

The separator layer 16 may include one or more separator films, sheets or plies that are each made of any suitable material or materials, such that at least one of the plies may be gas-impermeable. For example, each separator ply may include an ionically conductive, electronically non-conductive material, such as paper or microporous polymers laminated with a gas-impermeable ionomer, placed between the electrodes 12 and 14 to prevent electrical shorting and provide a galvanic couple between the two electrodes 12 and 14. The separator layer 16 may also include liquid electrolyte material to facilitate the transport of ions through the one or more separator plies.

The gas diffusion layer 18 may also be made of any suitable material, such as metal foam, polyolefin, glass, or nylon in a knit fabric, fibrous mat, or structured layer composite material.

Figure 2:
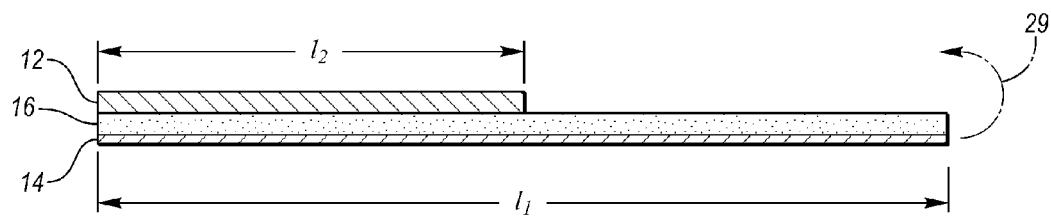
FIG. 2 is a schematic side view of the air electrode layer and separator layer of FIG. 1 in an un-folded condition.

To make the electrode assembly 10, the air electrode layer 14 may be formed to a desired length $l_1$, as shown in FIG. 2. The separator layer 16 having the same length $l_1$ or similar length (e.g., $l_1+/-10\%$ of $l_1$, or $l_1+/-5\%$ of $l_1$) may then be positioned on top of the air electrode layer 14, and the negative electrode layer 12 having a length $l_2$ may be positioned on the separator layer 16. Referring to FIGS. 1 and 2, the air electrode layer 14 and separator layer 16 may then be folded in a fold direction 29 over the negative electrode layer 12. The gas diffusion layer 18, which also has the same or similar length as the negative electrode layer 12 (e.g., $l_2+/-10\%$ of $l_2$, or $l_2+/-5\%$ of $l_2$), may then be positioned along one side of the folded bundle such that the gas diffusion layer 18 is positioned only adjacent or proximate the first portion 20 of the air electrode layer 14, as shown in FIG. 1. As explained above, the length $l_2$ may be about half the length of the length $l_1$. Furthermore, while the lengths $l_1$ and $l_2$ may be any suitable lengths depending on a particular application, in one embodiment $l_1$ may be in the range of 14 to 18 inches and $l_2$ may be in the range of 6 to 10 inches. In a more specific example, $l_1$ may be about 16 inches and $l_2$ may be about 8 inches.

Figure 3:
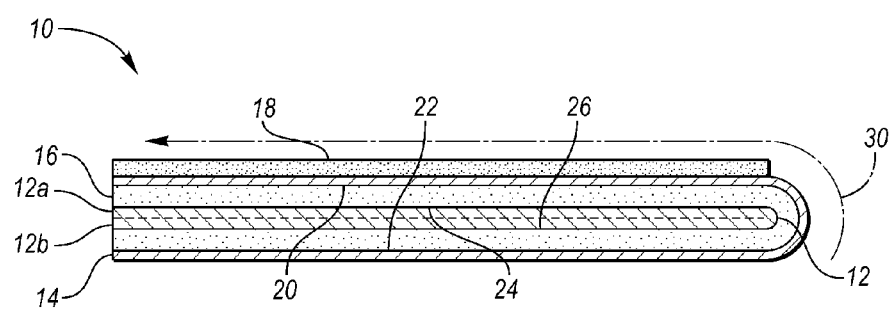
FIG. 3 shows an alternative configuration of the electrode assembly of FIG. 1.

In another version of the electrode assembly 10, the negative electrode layer 12 may have the same or similar initial length as the air electrode layer 14 (e.g., $l_1+/-10\%$ of $l_1$, or $l_1+/-5\%$ of $l_1$), but may be folded over such that the folded configuration has the length $l_2$. In yet another version, the electrode assembly 10 may be provided with two negative electrode layers that each have the length $l_2$ and that are placed or stacked on top of each other such that the active material of the layers are positioned on opposite sides of the stack. These embodiments are represented schematically in FIG. 3, which shows a dashed line separating negative electrode layer 12 into top and bottom portions 12a and 12b. The portions 12a and 12b may be portions of the same layer folded one on top of the other, or separate layers positioned one on top of the other.

In addition, two or more of the layers 12, 14, 16 and 18 may be bonded together such as through application of heat and/or pressure (e.g., compression) and/or through adhesive qualities of associated binder materials, for example, to form a laminated unit. As another example, some or all of the layers 12, 14, 16 and 18 may be held in place by one or more features (e.g., battery canister) of a battery configuration in which the electrode assembly 10 is used.

The electrode assembly 10 may be used in any suitable battery configuration, such as a flat pack, button, bobbin, or bipolar battery configuration. Referring to FIGS. 1 and 3-6, for example, the electrode assembly 10 may be spiral-wound (e.g., jelly-rolled, such as around a removable mandrel) in a direction 30 (shown in FIG. 1), and positioned in a conductive canister 32 to form a battery 34. The electrode assembly 10 is shown to be wound approximately three times in FIGS. 5 and 6. Any suitable number of windings, however, can be used. Furthermore, the spiral winding may be performed such that the gas diffusion layer 18 is in contact with, or disposed proximate to, the air electrode layer 14 substantially along the entire length of the air electrode layer 14 (e.g., along at least 80% or at least 90% of the entire length of the air electrode layer 14), as shown in FIG. 5. Further, the canister 32 may be used as a negative terminal by layering the electrode, separator and gas diffusion layers such that at least a portion of the outer wrap of the negative electrode layer 12 is in physical contact with the conductive canister 32, as shown in FIG. 5.

Because of the reduction in the size (e.g., length) of the gas diffusion layer 18, the overall size of the battery 34 may be reduced while still providing the same or similar output as a larger battery.

Referring to FIG. 6, an electrical load (not shown) can be placed across terminals of the battery 34 during discharge. For example, an electric load can be placed across positive terminal 36 and negative housing or can portion 38 of canister 32, wherein the positive terminal 36 and an associated positive post or tab 39, which is connected to the positive terminal 36 and the electrode assembly 10, may be electrically separated or insulated from the negative can portion 38 by insulating material such as an insulating ring 40. Air that enters the battery 34 through one or more gas ports 42 and one or more gas dispersion mats 44 may flow through the gas diffusion layer 18 and the air electrode layer 14, but is blocked from reacting directly with the negative electrode layer 12 due to the gas-impermeable separator layer 16. Oxygen from the air reacts with water on the air electrode layer 14 to form hydroxyl ions that then migrate through the separator layer 16 to the negative electrode layer 12 via electrolyte associated with the separator layer 16 and/or other layers. The ions then react with the active material of the negative electrode layer 12 to release electrons that travel to a current collector associated with the negative electrode layer 12, and also form an intermediate metal hydroxide, which then converts to a metal oxide, thereby releasing water.

During charge, an electrical source (not shown) can be placed across the terminals electrically connected to the current collectors associated with the electrodes 12 and 14. Electrons from the electrical source may travel through the current collector associated with the negative electrode layer 12 to the metal oxide in contact therewith. The electrons reduce the metal oxide to produce (or charge) the active material of the negative electrode layer 12, which in the presence of water releases hydroxide ions. These ions migrate through the electrolyte associated with the separator layer 16 to the air electrode layer 14, whereupon the hydroxide ions are oxidized to produce oxygen gas and water in the presence of a suitable catalyst. The oxidation of hydroxide releases electrons that are electrically conducted to the current collector associated with the air electrode layer 14 and then to the current collector associated with the negative electrode layer 12 via the current source. This completes the electrical and electrochemical circuit.

Figure 7:
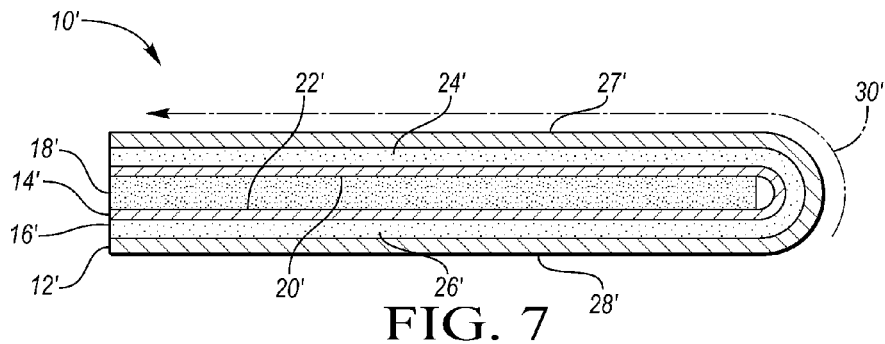
FIG. 7 is a schematic side view of another embodiment of an electrode assembly, according to the present disclosure, including a negative electrode layer, a separator layer and an air electrode layer folded over a gas diffusion layer.

FIG. 7 shows another embodiment 10' of an electrode assembly according to the present disclosure. The electrode assembly 10' includes a negative electrode layer 12', an air electrode layer 14', a separator layer 16' positioned between the negative electrode layer 12' and the air electrode layer 14', and a gas diffusion layer 18' positioned between portions of the air electrode layer 14', separator layer 16' and negative electrode layer 12'. Furthermore, the layers 12', 14', 16' and 18' of the electrode assembly 10' may be made of the same or similar materials as the corresponding layers of the electrode assembly 10.

In the embodiment shown in FIG. 7, the negative electrode layer 12', the air electrode layer 14' and the separator layer 16' each have about the same length, and those layers 12', 14' and 16' are folded over the gas diffusion layer 18' lengthwise such that the gas diffusion layer 18' is disposed between two portions 20' and 22' of the air electrode layer 14', two portions 24' and 26' of the separator layer 16 and two portions 27' and 28' of the negative electrode layer 12'.

With the above configuration, the gas diffusion layer 18' may have a length that is approximately half the length of one or more of the negative electrode layer 12', air electrode layer 14' and the separator layer 16'. For example, the length of the gas diffusion layer 18' may be 40% to 60% of the length of the negative electrode layer 12', the air electrode layer 14' and/or the separator layer 16'. As another example, the length of the gas diffusion layer 18' may be 45% to 55% of the length of the negative electrode layer 12', the air electrode layer 14' and/or the separator layer 16'.

Figure 8:
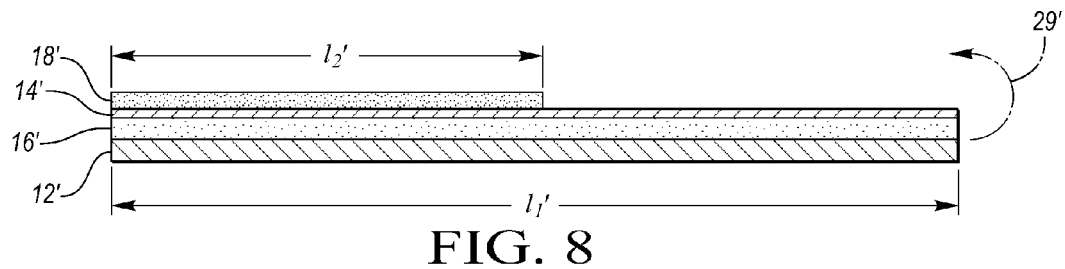
FIG. 8 is a schematic side view of the negative electrode layer, separator layer and air electrode layer of FIG. 7 in an un-folded condition.

To make the electrode assembly 10', the negative electrode layer 12', the air electrode layer 14' and the separator layer 16' may each be formed to the same or similar length generally indicated as $l_1'$ in FIG. 8 (e.g., $l_1'+/-10\%$ of $l_1'$). The separator layer 16' may be positioned on top of the negative electrode layer 12', and the air electrode layer 14' may be positioned on top of the separator layer 16'. Referring to FIGS. 7 and 8, those layers 12', 16' and 14' may then be folded in a fold direction 29' over the gas diffusion layer 18', which is positioned on the air electrode layer 14' and has a length $l_2'$. As explained above, the length $l_2'$ may be about half the length of the length $l_1'$.

In addition, two or more of the layers 12', 14', 16' and 18' may be bonded together such as through application of heat and/or pressure (e.g., compression) and/or through adhesive qualities of associated binder materials, for example, to form a laminated unit. As another example, some or all of the layers 12', 14', 16' and 18' may be held in place by one or more features (e.g., battery canister) of a battery configuration in which the electrode assembly 10' is used.

Figures 9, 10:
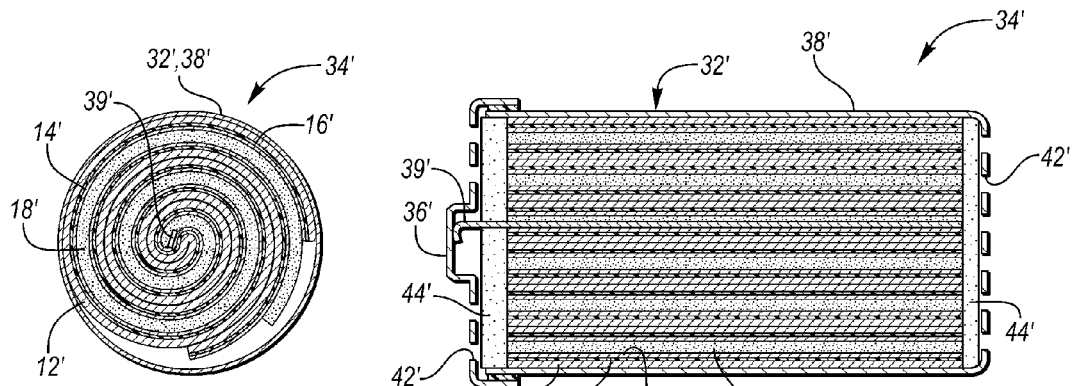
FIG. 9 is a cross-sectional view similar to FIG. 5 of a metal-air battery including the electrode assembly of FIG. 7 in a spiral wound condition, wherein the direction of view is the same as in FIG. 7.
FIG. 10 is a cross-sectional view similar to FIG. 6 of the metal-air battery of FIG. 8, including the electrode assembly of FIG. 6 in a spiral wound condition.

Like the electrode assembly 10, the electrode assembly 10' may be used in a variety of battery configurations, such as a flat pack, button, bobbin, or bipolar battery configuration. For example, the electrode assembly 10' having the configuration shown in FIG. 7 may be positioned in a generally flat canister to form a flat pack battery. As another example, referring to FIGS. 7, 9 and 10, the electrode assembly 10' may be spiral-wound (e.g., jelly-rolled) in a direction 30' (shown in FIG. 7), and positioned in a conductive canister 32' (shown in FIGS. 9 and 10) to form a battery 34'. The electrode assembly 10' is shown to be wound approximately three times in FIGS. 9 and 10. Any suitable number of windings, however, can be used. Furthermore, the battery 34' may include other features that are the same as or similar to features of the battery 34, and those features are identified with the same reference numbers (the reference numbers in FIGS. 9 and 10, however, each also include a single prime mark).

Because of the reduction in the size (e.g., length) of the gas diffusion layer 18', the overall size of the battery 34' may be reduced while still providing the same or similar output as a larger battery.

As mentioned above, the electrode assemblies 10 and 10' may be used in battery configurations other than those shown in FIGS. 4-6, 9 and 10. For example, each of the electrode assemblies 10 and 10' may be oval wound, such as on a duckbill mandrel, to form an oval-shaped roll, and the resulting roll may be compressed into a flat shape that is insertable into a prismatic battery can.

In light of the above embodiments, an electrode assembly for use with a metal-air battery according to the present disclosure may generally include a first electrode layer (e.g., negative electrode layer or air electrode layer) having a length and being folded lengthwise, and a gas diffusion layer having a length that is approximately half the length of the first electrode layer. Furthermore, the gas diffusion layer may be positioned proximate the first electrode layer or between first and second portions of the first electrode layer.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A metal-air battery comprising:
an electrode assembly including a first electrode layer having a length and being folded lengthwise, and a gas diffusion layer having a length that is approximately half the length of the first electrode layer, the gas diffusion layer being positioned proximate the first electrode layer or between first and second portions of the first electrode layer.

2. The battery of claim 1 wherein the first electrode layer is an air electrode layer, and the gas diffusion layer is positioned proximate the air electrode layer, and wherein the electrode assembly further includes a negative electrode layer positioned between first and second portions of the air electrode layer.

3. The battery of claim 2 wherein the electrode assembly is spiral wound such that the gas diffusion layer is positioned proximate the air electrode layer substantially along an entire length of the air electrode layer.

4. The battery of claim 2 wherein the negative electrode layer is formed as a double-sided negative electrode layer.

5. The battery of claim 2 wherein the negative electrode layer has a length approximately equal to the length of the air electrode layer, and wherein the negative electrode layer is folded lengthwise.

6. The battery of claim 2 wherein the electrode assembly includes an additional negative electrode layer positioned on the negative electrode layer and between the first and second portions of the air electrode layer.

7. The battery of claim 2 wherein the electrode assembly further comprises a separator layer positioned between the negative electrode layer and the air electrode layer, and the separator layer is configured to permit ions to pass therethrough and to electrically isolate the air electrode layer and the negative electrode layer.

8. The battery of claim 7 wherein the separator layer is porous.

9. The battery of claim 1 wherein the length of the gas diffusion layer is 40-60% of the length of the first electrode layer.

10. The battery of claim 1 wherein the length of the gas diffusion layer is 45-55% of the length of the first electrode layer.

11. The battery of claim 1 wherein the electrode assembly is spiral wound.

12. The battery of claim 1 wherein the electrode assembly is wound and compressed such that the electrode assembly has a flat shape.

13. The battery of claim 1 wherein the first electrode layer is an air electrode layer, and the gas diffusion layer is disposed between first and second portions of the air electrode layer.

14. The battery of claim 13 wherein the electrode assembly further comprises a negative electrode layer having a length approximately equal to the length of the air electrode layer and being folded over the gas diffusion layer.

15. The battery of claim 13 wherein the electrode assembly is spiral wound.

16. The battery of claim 13 wherein the electrode assembly is wound and compressed such that the electrode assembly has a flat shape.

17. The battery of claim 14 wherein the electrode assembly further comprises a separator layer positioned between the negative electrode layer and the air electrode layer, and the separator layer is configured to permit ions to pass therethrough and to electrically isolate the air electrode layer and the negative electrode layer.

18. The battery of claim 17 further comprising electrolyte associated with the separator layer.

19. A metal-air battery comprising:
an electrode assembly including an air electrode layer having a length and being folded lengthwise, a negative electrode layer positioned between first and second portions of the folded air electrode layer, and a gas diffusion layer having a length that is approximately half the length of the air electrode layer, the gas diffusion layer being positioned proximate the air electrode layer.

20. A metal-air battery comprising:
an electrode assembly including a negative electrode layer having a length, an air electrode layer having a length that is approximately the same as the length of the negative electrode layer, and a gas diffusion layer having a length that is approximately half the length of the negative electrode layer, wherein the negative electrode layer and the air electrode layer are folded lengthwise over the gas diffusion layer such that the gas diffusion layer is positioned between two portions of each of the negative electrode layer and the air electrode layer.

* * * * *